United States Patent [19]

McQueen

[11] Patent Number: 4,967,593

[45] Date of Patent: Nov. 6, 1990

[54] METHOD AND APPARATUS FOR DISTINGUISHING BETWEEN DIFFERENT SUBSTANCES IN A CONTAINER

[75] Inventor: Malcolm M. McQueen, Fallbrook, Calif.

[73] Assignee: Fluid Components, Inc., San Marcos, Calif.

[21] Appl. No.: 383,808

[22] Filed: Jul. 20, 1989

[51] Int. Cl.$^5$ .............................................. G01F 23/22
[52] U.S. Cl. .................................. 73/295; 374/10; 374/54; 340/622; 210/86; 210/744; 210/742
[58] Field of Search .................... 73/295; 374/10, 54; 340/622; 210/86, 742, 744

[56] References Cited

U.S. PATENT DOCUMENTS

| | | | |
|---|---|---|---|
| 3,923,655 | 12/1975 | McKinney | 73/295 |
| 4,423,629 | 1/1984 | Ara et al. | 374/54 |
| 4,440,717 | 4/1984 | Bevilacqua et al. | 73/295 |
| 4,449,403 | 5/1984 | McQueen | 73/295 |
| 4,603,580 | 8/1986 | Waring | 73/295 |
| 4,720,997 | 1/1988 | Doak et al. | 73/295 |
| 4,741,209 | 5/1988 | McCulloch | 73/295 |
| 4,785,665 | 11/1988 | McCulloch | 73/295 |
| 4,859,076 | 8/1989 | Twerdochlib | 374/10 |

FOREIGN PATENT DOCUMENTS

| | | | |
|---|---|---|---|
| 0044923 | 3/1980 | Japan | 73/295 |
| 0160821 | 9/1983 | Japan | 73/295 |
| 2037990 | 7/1980 | United Kingdom | 73/295 |
| 2120482 | 11/1983 | United Kingdom | 73/295 |

Primary Examiner—William A. Cuchlinski, Jr.
Assistant Examiner—Diego F. F. Gutierrez

[57] ABSTRACT

A method for determining the level of heavier particulate waste material in a storage tank of liquid. The method comprises mounting a heated sensor below an unheated or reference sensor so that the reference sensor is influenced under some circumstances by the heater, but is insulated therefrom when the heated sensor is embedded in the particulate material. The invention includes the apparatus for accomplishing the method.

14 Claims, 1 Drawing Sheet

METHOD AND APPARATUS FOR DISTINGUISHING BETWEEN DIFFERENT SUBSTANCES IN A CONTAINER

FIELD OF THE INVENTION

This invention relates generally to material level measurement and more particularly relates to a method and apparatus for determining build up of the level of a heavier or non-missible substance in a liquid or granulated solids by means of temperature responsive sensors.

BACKGROUND OF THE INVENTION

Liquid level detection devices employing a closely linked heated sensor and an unheated sensor have been available for some time. They may take on various forms, the one of primary interest in this case being short probes extending through the wall of a container or conduit and comprising resistance temperature devices (RTD's). The unheated RTD provides a signal representative of the temperature of the media, normally a fluid, in which it is immersed. The heated RTD provides a signal representative of its temperature as modified by the addition of heat and by the thermal dissipation characteristics of the gases, fluid, granulated solids, powdered materials and fluidized beds in which it is immersed.

For example, if both sensors are in air, the heated RTD will be substantially higher in temperature and provide a substantially different signal represented by its temperature than is true of the unheated RTD. If both sensors are immersed in water, the water dissipates the heat from the heated RTD to a much greater extent than does air. The differential temperature between the two RTD's immersed in water is substantially less than when the sensors are surrounded by air. Of course, the unheated RTD is not affected by the characteristics of the substance in which it is immersed since it reflects the temperature of its environment, the media in which it resides.

The general principles set forth above apply when the sensors are employed to determine the level of any substance with respect to another, that is, liquid with air above it, or a heavy material with water above it. However, when the liquid and material constitute waste materials, or if the liquid is not pure water, other factors are present which could affect the accuracy of the output of the sensors. For example, the water could contain a colloid and granulated material simultaneously. The colloid can settle on the sensors and create an undesirable but similar differential temperature as that caused by the granulated material. The unit would thereby falsely signal that granulated material was present when, in fact, only colloids are present.

SUMMARY OF THE INVENTION

Broadly speaking, this invention comprises the use of liquid level detectors of the type described above, but modified to provide an accurate representation of a level of heavy waste material, or alternatively, where a liquid, a liquid slurry or liquid with colloids exists above the heavy waste material.

A heated RTD and an unheated RTD are connected in the side wall of a waste storage container so that the sensors project inwardly from the wall. These sensors are placed at the level at which it is desired to detect the presence of heavy waste material so that appropriate indications may be provided when it is necessary to clean out the container. This waste material level determination is accomplished by positioning the heated RTD vertically below and spaced from the unheated RTD.

The relative positions and distance of the heated and unheated RTD's are generally not extremely important when they are immersed to determine if they are in pure water or are surrounded by air. Past practice has established ⅛ to ½ inch as practical spacing, with the sensors positioned in a horizontal plane. However, when the waste liquid is a slurry which contains a gel, colloidal forming or other deposit build-up material, the relative positions of the sensors is important. If the sensors are coated by a colloid or other insulative material, the heated RTD will not be subject to as much heat dissipation as when in pure water. In that case, the temperature difference might be in the vicinity of 25°F. whereas the temperature difference in pure water could be around 10°F. If the heavy waste material is sand or equivalent, the expected temperature differential between the heated and unheated sensors would be approximately 25°F. because sand is not as good a dissipator of heat as is clear water. It prevents convection motion. It will be noticed that if the sensors are positioned in spaced relationship side by side, the colloid coated sensors in liquid would have the same differential temperature as the sensors in the heavy waste material.

By positioning the sensors with the heated sensor vertically beneath the unheated sensor, when they are coated with thin slurry, monomer, polymer or colloidal material, the heat from the heated sensor will rise vertically and affect the ordinarily unheated sensor by convective heat transfer more than it would in a horizontal plane in pure water, thereby reducing the temperature differential to approximately the same as it would be with both sensors in unadulterated pure water. However, when the sensors are surrounded by the heavy waste material, such as sand or other media that will not support convective heat transfer, the temperature differential is once again relatively high, typically in the order of two or three times the temperature differential in pure water. That is because the heat of the heated sensor will not only be more slowly dissipated, but it will also tend not to heat the unheated sensor as much as when it is in the slurry and/or coated with the colloid material where convective heat transfer is still possible. Thus the output signals will provide indication that the sensors, or only the heated sensor, are buried in the heavy waste material, whether or not they are coated with the colloidal material. The sensors can be coupled with a heated and a balancing dummy sensor element or the sensors can be self heated and thereby eliminate the heater and its attendant dummy heater.

BRIEF DESCRIPTION OF THE DRAWING

The objects, advantages and features of the invention will be more clearly perceived from the following detailed description, when read in conjunction with the accompanying drawing, in which.

DESCRIPTION OF THE PREFERRED EMBODIMENTS

Figure 1:
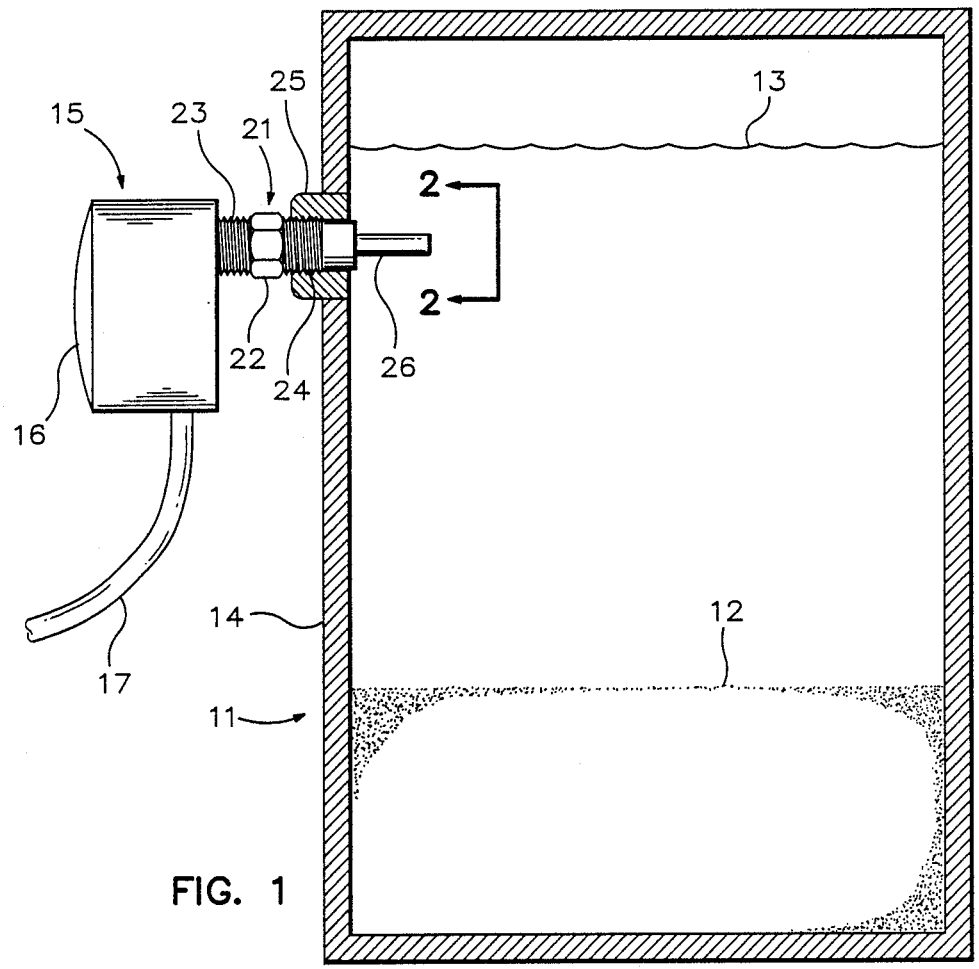
FIG. 1 is a cross sectional view of a waste container, showing the sensor device mounted in the wall thereof.

With reference now to the drawing, FIG. 1 shows storage tank 11 having a heavy material such as sand in the bottom at level 12 and liquid above the sand at surface level 13. The tank is shown as closed on all sides but the usual inlet, outlet, access and drain ports would be present. In wall 14 is mounted sensor device 15 comprised of housing 16, cable 17 and sensor head 21. The housing may contain a ceramic or plastic terminal block or contain the electronic circuitry of the unit. The cable may be as long as 500 feet from sensor 15 and connects to the system controller or to remote electronic circuitry. When the electronics are integral with device 15, they typically detect the voltage difference between the sensors by means of a bridge circuit. This temperature difference representing signal can then be employed to provide a visual or audible signal or cause other appropriate action. Cable 17 also provides power to the circuit components. When the electronics are remote from device 15 they function in the same way but are physically located at a place remote from housing 16.

The sensor head comprises neck 22 threaded on both ends with a hex-shaped central area to facilitate installation and removal. Rear threads 23 connect the neck to the housing. Front threads 24 connect the neck to threaded coupling 25 fixed in side 14 of the tank. Sensor elements 26 project into the interior of the tank and are normally submerged in the liquid or other media in the tank.

Figure 2:
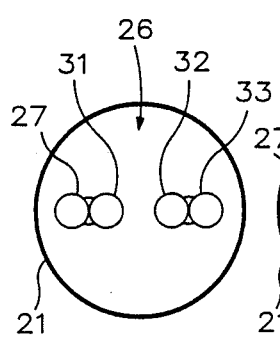
FIG. 2 shows the heated and the unheated sensors in a side-by-side horizontal plane arrangement.

As shown in FIG. 2, in the preferred form sensors 26 comprise heater element 27, sensor element 31, reference sensor element 32 and balancing dummy heater element 33. Alternatively, heater 27 and dummy element 33 can be eliminated and extra current passed through sensor 31 to make it self heated. By way of example, the spacing between the heated and unheated sensors is in the range of ⅛ inch to ½ inch. Other spacings could provide operative results. For normal operation, FIG. 2 showing the orientation of the sensor unit as installed prior to this invention, it can easily determine when the sensor elements are in air and when they are in a liquid such as water. Unheated or reference sensor 32 always reflects the environment and produces a signal representing the temperature of the media in which it resides. Heated sensor 31 reflects the heat transfer qualitites of the environment as influenced by the heat from heater 27. For example, in air, which dissipates heat with difficulty, the heater will have relatively great influence on sensor 31 and $\Delta T$ may be 100°F. for example. When immersed in water, an efficient heat dissipator, much of the influence of the heater on sensor 31 will be negated by the heat carried away by the water. In that instance, with the same heater flux or power and with the water temperature the same as when the environment was air, sensor $\Delta T$ is much lower, possibly 10°F. This results from the fact that heat is dissipated much more quickly and easily from the heated sensor when it is in water. Dummy element 33 is provided for balancing the true response when the thermal qualities of the media change rapidly. For example, being that the heater and the heated sensor are of equal thermal mass as the dummy and reference sensor, if the water temperature changes rapidly, the differential temperature (approximately 10°F.) would remain the same as both sensors cooled or heated rapidly in response to the change in media temperature. Failure to provide this physical mass balancing feature would result in reading errors during thermal transients of the sensed media.

When the sensors are in sand at the bottom of the tank, heat dissipation is reduced compared with that of water due to the nature of the characteristics of sand or other particulate material. That could result in $\Delta T$ being 25°F. because the effect of the heater on sensor 31 is not dissipated by the sand as much as in water.

Figure 3:
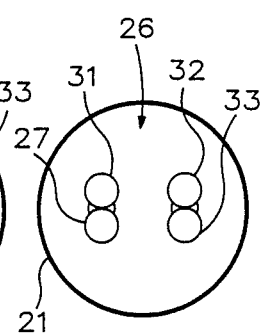
FIG. 3 shows an alternative prior art side-by-side arrangement.

FIG. 3 is an alternative arrangement of the horizontal orientation of sensors. Each heater/sensor pair is vertically arranged, but each such pair is oriented horizontally from the other pair. The operating results do not differ significantly.

For purposes of convenience, the same reference numerals are used for each sensor element to permit ready comparison. In each of FIGS. 2-5, the heater is 27, the heated sensor is 31, the reference sensor is 32 and the dummy element is 33.

The electronics, which are conventional and straightforward, provide signals indicating when the sensors are in air and when they are in water, thus sensing water level.

There may be instances where the fluid in the tank is a heavy waste material, including a liquid containing a particulate substance such as sand, or it may be a liquid slurry, a liquid containing a gel or a colloid type material, or it may include monomers or polymers. Whenever the liquid includes material which settles on surfaces or builds up a deposit on a surface, the sensor elements may be relatively quickly coated by materials which inhibit heat dissipation. The reference sensor is not directly affected because it still reflects media temperature. The heater, when it is at the same power as previously discussed, excessively heats sensor 31 in the same manner and to the same extent, because of their close proximity and the insulative effect of the coating. The colloid coating prevents ready heat dissipation so the temperature differential of the sensors when in colloid containing liquid, with the configuration of FIGS. 2 and 3, is approximately 25°F., falsely indicating that the sensors are in the sand. That is obviously an erroneous reading when it is known that the sensors are immersed in the liquid albeit with colloids and the like entrained and coated on the sensors. For purposes of convenience, the term "colloid containing liquid" will be considered to include any liquid having substances which form a coating or deposit on surfaces.

Figure 4:
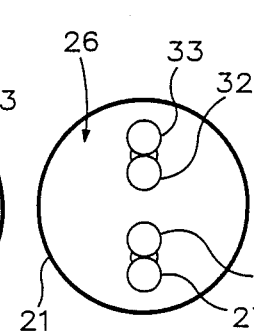
FIG. 4 shows the heated sensor positioned vertically below the unheated sensor.
Figure 5:
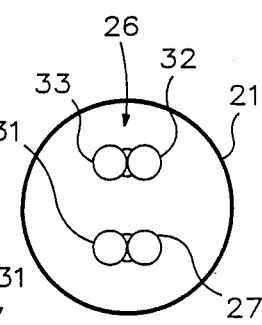
FIG. 5 shows an alternative vertical sensor arrangement.

It has been discovered that by rotating the sensor head 90° the sensor system provides accurate readings to distinguish immersion in colloid containing water from immersion in the heavy waste or particulate material that settles out of the liquid. That is because even though coated with the colloid, the sensors of FIGS. 4 and 5 provide accurate readings resulting from the fact that the heater functions in a different manner than in the FIGS. 2 and 3 configurations. FIGS. 4 and 5 are alternative embodiments of vertically arranged sensors. Their operating results are not significantly different from each other. Heater 27 heats sensor 31 because it is in close proximity thereto. Heater 27 also heats reference sensor 32 because, although it is farther away from the heater than is sensor 31, sensor 32 is above the heater and benefits from the fact that heat rises and it is convectively heated so that the differential temperature resembles that experienced in FIGS. 2 and 3 in clear water.

Configured as in FIGS. 4 and 5, when the sensors are immersed in the liquid, even though they are colloid coated the $\Delta T$ would be about 10°F. because of the relative heat dissipation of sensors 31 and 32. The heater has some, but less, effect on reference sensor 32 because of the greater distance from the heater as compared with sensor 31. When the sensors are embedded in the particulate material there is more insulation and no convection between heater 27 and sensor 32 so that the heater has much less heating effect on sensor 32 than when they are in clear water. At the same time, the close proximity of heater 27 and sensor 31 makes the heating effect on that sensor much greater than on sensor 32 so $\Delta T$ would then be in the order of 25°F.

The difference between FIGS. 4 and 5 and FIGS. 2 and 3 is the difference between an operative and an inoperative sensor under the particular set of circumstances specified. For improved visualization, temperature and $\Delta T$ comparisons are provided in Tables 1 and 2. The numbers are given for explanation only and may differ in practice, but they are representative of actual situations. As an added feature, the arrangements of FIGS. 4 and 5 will benefit operators even in the absence of colloids because the differential temperature in clear water will tend to be even lower as compared to FIGS. 2 and 3, while the differential temperature of the FIGS. 4 and 5 embodiments, when buried under heavy particulate waste media, will be about the same as in the FIGS. 2 and 3 embodiments. This means that the differential between clear liquid and heavy waste is even more pronounced and more clearly distinguished.

TABLE 1

Horizontally Oriented Heated and Reference Sensors (FIGS. 2 and 3)
Media in Which Sensors Reside

| | Air | | Clear Liquid | | Particulate Material (Colloid) | | Heavy Waste | |
|---|---|---|---|---|---|---|---|---|
| Sensor | $T_1$ | $T_2$ | $T_1$ | $T_2$ | $T_1$ | $T_2$ | $T_1$ | $T_2$ |
| Actual Temp. | 70° | 170° | 70° | 80° | 70° | 95° | 70° | 95° |
| $\Delta T$ | 100° | | 10° | | 25° | | 25° | |

$T_1$ is the unheated or reference sensor
$T_2$ is the heated sensor

TABLE 2

Vertically Oriented Heated and Unheated Sensors (FIGS. 4 and 5)
Media in Which Sensors Reside

| | Air | | Clear Liquid | | Particulate Material (Colloid) | | Heavy Waste | |
|---|---|---|---|---|---|---|---|---|
| Sensor | $T_1$ | $T_2$ | $T_1$ | $T_2$ | $T_1$ | $T_2$ | $T_1$ | $T_2$ |
| Actual Temp. | 90° | 170° | 80° | 85° | 80° | 90° | 70° | 95° |
| $\Delta T$ | 80° | | 5° | | 10° | | 25° | |

$T_1$ is the unheated or reference sensor
$T_2$ is the heated sensor

It should be noted that the desired higher $\Delta T$ reading will also result when just the bottom sensor portion, heater 27 and sensor 31, are buried in the sand. The same isolation from reference sensor 32 and lack of convection occur as when both portions of the sensor unit are so buried.

The $\Delta T$ numbers given above are for purposes of example only. The actual temperature readings and differentials may be significantly different than those mentioned, depending on the heater flux or power as set by the designer, but the principle is the same. It is desired that the $\Delta T$ difference between clear liquid or coated sensor conditions, and being buried in heavy waste material be a factor of two or greater, but the sensor will provide useful information if that $\Delta T$ differential is between 1.5 and 5 times the $\Delta T$ of the clear liquid or coated sensor conditions.

In view of the above description, it is likely that modifications and improvements will occur to those skilled in the art which are within the scope of the accompanying claims.

What is claimed is:

1. Apparatus including appropriate electrical circuitry for determining the level of heavy waste semifluid material in a tank of two phase liquid, the first phase liquid including slurry constituting a colloid-forming or surface deposit-building material, the second phase liquid including heavier, dense, viscous or particle laden material, said apparatus comprising:
   a heated resistance temperature detector (RTD) extending into the interior of the tank at about the level at which it is desired to detect the heavy waste material, said heated RTD being coupled to said circuitry;
   an unheated RTD located generally vertically above and spaced from said heated RTD, said unheated RTD being coupled to said circuitry, said heated and unheated RTD's being physically separate and separately immersed in the liquid;
   wherein when both said heated and unheated RTD's are immersed in clear water, their temperature differential is $\Delta T$, when both RTD's are coated with the surface deposit-building material, their temperature differential in the liquid is about $\Delta T$, and when the bottom or both RTD's are buried in the heavy waste material their temperature differential is measurably greater, thereby indicating the level of heavy waste material.

2. The apparatus recited in claim 1, wherein $\Delta T$ is about 10°.

3. The apparatus recited in claim 1, wherein the term measurably greater means about $\Delta T$.

4. The apparatus recited in claim 1, and further comprising a heater element engaged with said heated RTD.

5. The apparatus recited in claim 4, and further comprising a balancing dummy element engaged with said unheated RTD, said sensor/dummy element combination thermally balancing the dual heater/sensor combination.

6. The apparatus recited in claim 4, wherein said heater element, heated RTD and unheated RTD are vertically aligned.

7. The apparatus recited in claim 5, wherein said heater element, heated RTD, unheated RTD and dummy element are vertically aligned.

8. The apparatus recited in claim 4, wherein said heater element and heated RTD are horizontally oriented and positioned vertically below said unheated RTD.

9. The apparatus recited in claim 5, wherein said heater element and heated RTD are horizontally oriented and said dummy element and unheated RTD are horizontally arranged and positioned vertically above said heater element and heated RTD.

10. The apparatus recited in claim 1, wherein the term measurably greater means a range of 1.5–5 $\Delta T$.

11. A method for determining the level of heavy waste semi-fluid material in a tank of two phase liquid, the first phase liquid including slurry constituting a colloid-forming or surface deposit-building material, the second phase liquid including heavier, dense, viscous or particle laden material, said method comprising the steps of:

mounting a pair of spaced thermally responsive devices inside the tank at a level at which it is desired to detect the presence of heavy waste material, one of the devices being heated, the other being unheated, so that the heated device is positioned generally below the unheated device, the heated and the unheated devices being physically separate and separately immersed in the liquid;

producing a signal from each thermally responsive device which represents the temperature of each device;

determining the differential temperature between the devices, the value of the temperature differential indicating whether the devices are immersed in the liquid or are buried in the heavy waste material.

12. The method recited in claim 11, wherein if the temperature differential equals $\Delta T$ both devices are immersed in the liquid, whereas if the temperature differential is measurably greater than $\Delta T$ the devices are buried in the waste material.

13. The method recited in claim 12, wherein the term measurably greater means a range of 1.5–5 $\Delta T$.

14. The method recited in claim 12, wherein the term measurably greater means 2 $\Delta T$.

* * * * *